United States Patent [19]

Lawrence et al.

[11] Patent Number: 4,464,730

[45] Date of Patent: Aug. 7, 1984

[54] TEXT PROCESSING APPARATUS WITH EDITING OF STORED DOCUMENT AT EACH KEYSTROKE

[75] Inventors: Stephen G. Lawrence, Southampton; Brian H. Middleton, Winchester, both of England

[73] Assignee: International Business Machines Corporation, Armonk, N.Y.

[21] Appl. No.: 273,273

[22] Filed: Jun. 12, 1981

[30] Foreign Application Priority Data

Jun. 30, 1980 [EP] European Pat. Off. ........... 80302196

[51] Int. Cl.³ .............................................. G06F 9/00
[52] U.S. Cl. ................................................. 364/900
[58] Field of Search ............................. 364/200, 900

[56] References Cited

U.S. PATENT DOCUMENTS

| | | | |
|---|---|---|---|
| 3,701,972 | 10/1972 | Berkeley et al. | 364/200 |
| 3,972,026 | 7/1976 | Waitman et al. | 364/200 |
| 4,040,024 | 8/1977 | Cowe et al. | 364/900 |
| 4,203,107 | 5/1980 | Lovercheck | 364/900 |

OTHER PUBLICATIONS

Do the Job for Less, by Stephen Guralnick, Kilobaud, Mar. 1980, p. 110.
Super Word Processors, by Rod Hallen, Kilobaud, Jun. 1980, p. 214.
Development of A Text Handling Program, Kilobaud, Feb. 1980, p. 112.

*Primary Examiner*—Felix D. Gruber
*Assistant Examiner*—John G. Mills
*Attorney, Agent, or Firm*—W. S. Robertson

[57] ABSTRACT

A text terminal in which a text stream received on a communication link is segmented by a segmenter into chained variable-length segments which are stored in a random access text store. Each segment can contain at most one extended formatting command. Segments have slack areas to allow the subsequent insertion of text. A text editor receives keystroke signals from a keyboard and modifies the stored text stream, new segments being created as necessary for extended formatting commands or when slack areas are full. An interpreter/formatter is invoked when a received text stream has been segmented or when the stored text stream has been modified to format and map the stored text stream into a refresh buffer driving a cathode ray tube (CRT) display. The interpreter/formatter maintains a status index with condensed versions of the extended formatting commands stored in the text stream. Formatting is inhibited by the editor if it receives a keystroke requiring modification of the stored text. After editing segmented text is desegmented by a desegmenter and returned to the host along a communication link in the form in which it was received. Preferably, the terminal is implemented with a microprocessor which can also control standard data entry applications as well as text processing.

4 Claims, 5 Drawing Figures

TEXT PROCESSING APPARATUS WITH EDITING OF STORED DOCUMENT AT EACH KEYSTROKE

FIELD OF THE INVENTION

This invention relates to a text processing apparatus in which a document is stored in linear text stream form and is edited at each keystroke and reformatted on a display screen after updating.

CROSS REFERENCES TO RELATED APPLICATIONS

Such an apparatus is described in our co-pending European Patent application No. 80 3021955 entitled "Text Processing Apparatus with Direct Formatting Of Text" filed 30/7/80 incorporated by reference in this specification. Text, including symbolic characters and text control characters, is stored in a text store in linear text stream form. A high priority editor processes keystrokes and modifies the stored text in accordance therewith. When a stored document has been modified, a formatter directly maps the stored document (or that part of it which is to be displayed) onto the display screen. Such an arrangement of separate editing and formatting functions simplifies the data flow and ensures that the document stored in the text store is always up-to-date. The aforementioned Patent application indicates that the text may be stored in storage blocks or segments of variable or fixed length which are chained together.

Our European Patent application No. 80 3021922 entitled "Virtual Memory Terminal" filed on the same day as the present application and incorporated by reference in this specification describes a virtual memory terminal into which various application codes may be loaded to make the terminal perform a particular function. A storage manager is used to manage the storage of data in a random access memory.

The Prior Art

It is preferred that the text data stream is in the SCS (System Network Architecture Character Set) form. The text stream includes text or symbolic character codes and text command codes. The text command codes are of two basic types, one type, referred to in this specification as extended formatting commands, generally affects the layout or format of the document: the other type are referred to as single-character commands. The extended document formatting commands each consist of a plurality (variable) of bytes, the first of which is called the Control Sequence Prefix (CSP) and is always the same. The single-character command, on the other hand, is only one byte in length.

Chapter 4 of the IBM 3730 Distributed Office Communication System: Application Programmer's Reference Manual, published by International Business Machines Corporation, sets out the more common text commands in some detail. Typical extended document formatting commands include centering, depth, footing, heading, imbed, page boundary, page end, page number, set adjust mode, set no-adjust mode, set temporary left margin, skip, tabset and width commands. Typical of the single-character formatting commands are the tabulate, new line, null, backspace, required hyphen, required space, half-line down (subscript), half-line up (superscript) and syllable hyphen commands.

It will be seen that the extended document formatting commands affect multiple characters including those some distance away from the command in the text data stream. The single-character commands have an effect on the immediately following text character.

BRIEF SUMMARY OF THE INVENTION

An object of the present invention is to provide a text processing apparatus in which text is stored in variable-length storage segments as a text data stream with forward and reverse chaining of the storage segments. Another object is to provide text processing apparatus in which editing, formatting and storage management functions may be performed by a single microprocessor without undue undesirable impact on the performance thereof.

According to the present invention, a text processing apparatus comprises (1) a keyboard for entering text, (2) means for receiving text consisting of symbolic and control characters including extended formatting commands in text stream format, (3) means for storing said text stream including said control characters in said data stream format, (4) editing means for receiving keystroke signals from said keyboard and modifying said stored text stream in accordance therewith on a keystroke-by-keystroke basis, and (5) a display for displaying said stored text in accordance with text control characters contained therein, characterized in that said apparatus further includes (6) text segmenting means for dividing said received text stream into chained segments of variable-length having a predetermined maximum length with each segment having at most one extended formatting command therein and segments not having an extended formatting command therein having a slack area, and (7) formatting means for reading said segmented text stream from said text store and mapping the contents thereof onto said display.

The foregoing and other objects, features and advantages of the invention will be apparent from the following more particular description of a preferred embodiment of the invention is illustrated in the accompanying drawings.

DETAILED DESCRIPTION

Figure 1:
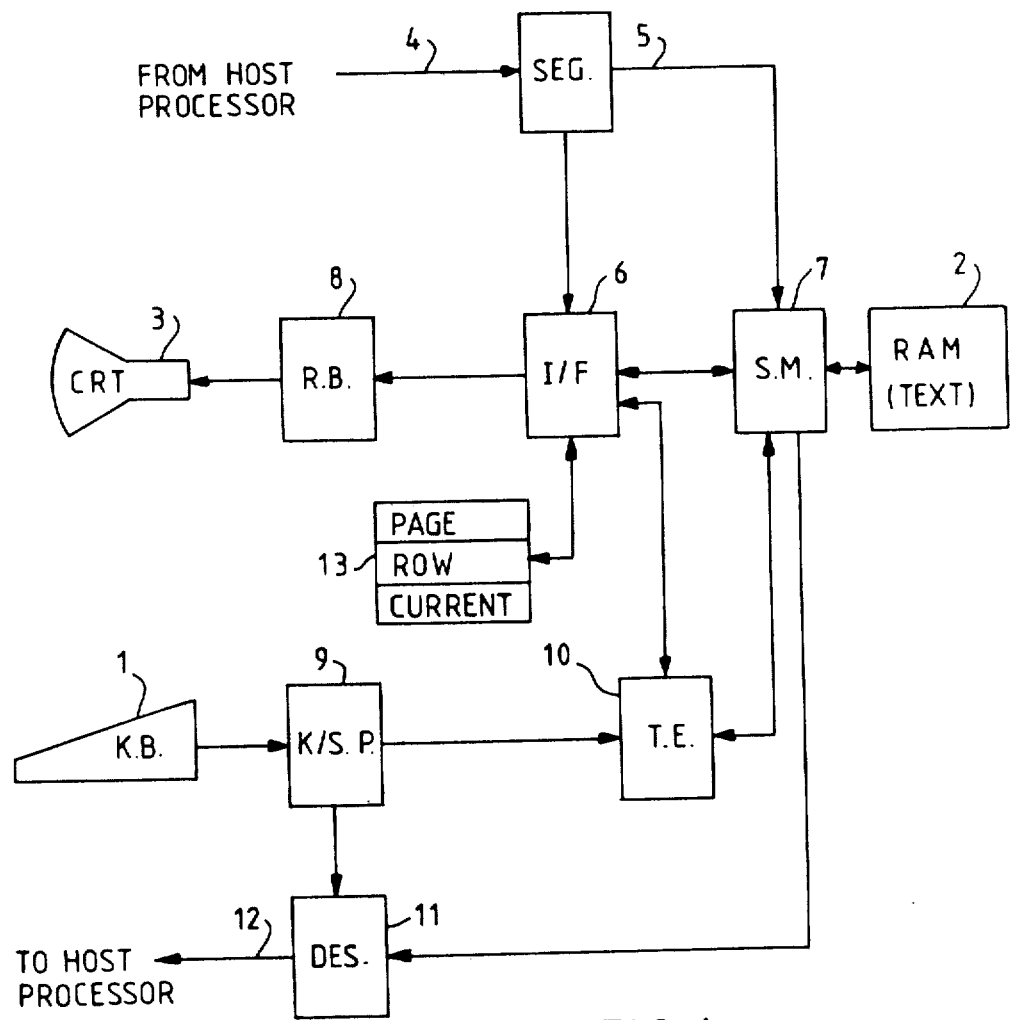
FIG. 1 is a block diagram showing the component parts of a text processing apparatus according to the present invention.

An Overview - FIG. 1

In FIG. 1, a text processing terminal comprises a keyboard (KB) 1 by means of which an operator can enter, delete or change text including symbolic characters and formatting characters in a text data stream stored in a text store 2 constituted by a random access memory. Text stored in the text store 2, or a part of the stored text, is displayed on a display screen 3, conveniently constituted by a cathode ray tube (CRT) display. A document to be displayed and/or edited on the terminal is received on communication line 4 from a host processor, not shown, by a segmenter (SEG) 5 which, in conjunction with a store manager (SM) 7 divides the text stream into variable length segments stored in store 2. To display the text on the display 3, an interpreter/formatter 6 maps the text stream into a refresh buffer (RB) 8 from which the CRT display can be periodically refreshed.

A keystroke processor (K/SP) 9 receives keystrokes from the keyboard 1 and invokes a text editor (TE) 10. The editor 10 causes modification of the text data stream stored in store 2 and the changed text will subsequently be formatted and mapped into the refresh buffer 8 for display on the screen 3. During the segmenting and formatting processes, the interpreter/formatter 6 maintains a status index 13 in random access memory. The status index 13 consists of page indices, one for each page of text in the store 3, a row index for each line of text of the current page, and a current index for the current line of text displayed on the screen.

The segmenter 5 maintains a segment number counter, not shown, to identify newly created segments within the store 2. This counter is also available when new segments are created during a subsequent text insertion.

Processing by the interpreter/formatter 6 is initiated either by the segmenter 5 on completion of transferring incoming text to the store 2 or by the text editor 10 on completion of an update to the text in the store 2.

The text editor 10 employs a two-step process. Firstly, it invokes the interpreter/formatter 6 to determine the physical cursor position relative to the text in the store 2. At the end of this phase, a corresponding logical cursor position is known within the store. Secondly, the particular operation on the text is performed (insertion/deletion) at the logical cursor position and the interpreter/formatter 6 is re-invoked to display the effect of the change on the screen.

The store manager 7 uses the VMT storage primitives unchanged. All stored text is referred to using the VMT bipartite addressing (segment identifier plus offset).

Figure 2:
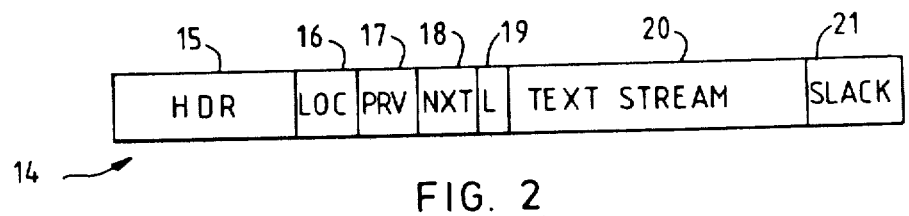
FIG. 2 shows the structure of a text storage segment.

The Text Segment Header - FIG. 2

As shown in FIG. 2, a text segment 14 includes a 6-byte header field (HDR) 15 which contains the segment identification and its length, a 2-byte locator field (LOC) 16 which identifies a storage location containing the real address of the segment, a 2-byte field (PRV) 17 which identifies the previous segment, a 2-byte field (NXT) 18 which identifies the next segment, a 1-byte field (L) 19 which contains an indication of the length of the text stream stored in the segment, a variable-length field 20 containing the text data stream stored in that segment, and a field 21 forming a slack area of spare space into which the text data field 20 can expand as a result of insertion. The header field 15 and locator field 16 are used by the store manager 7, FIG. 1, to fetch and store segments within the store 2. This storage management process is described fully in the aforementioned European Patent application No. 80 3021922, entitled, "Virtual Memory Terminal" and will only be briefly referred to in this specification. The fields 17 and 18 are used by the interpreter/formatter 6, FIG. 1, to obtain the previous and succeeding portions of text from the store 2 (using the store manager 7). The text length field 19 enables the text editor 10 to determine quickly whether the segment is empty, that it has no text within it, or full, that is has no slack space within it.

Figure 3:
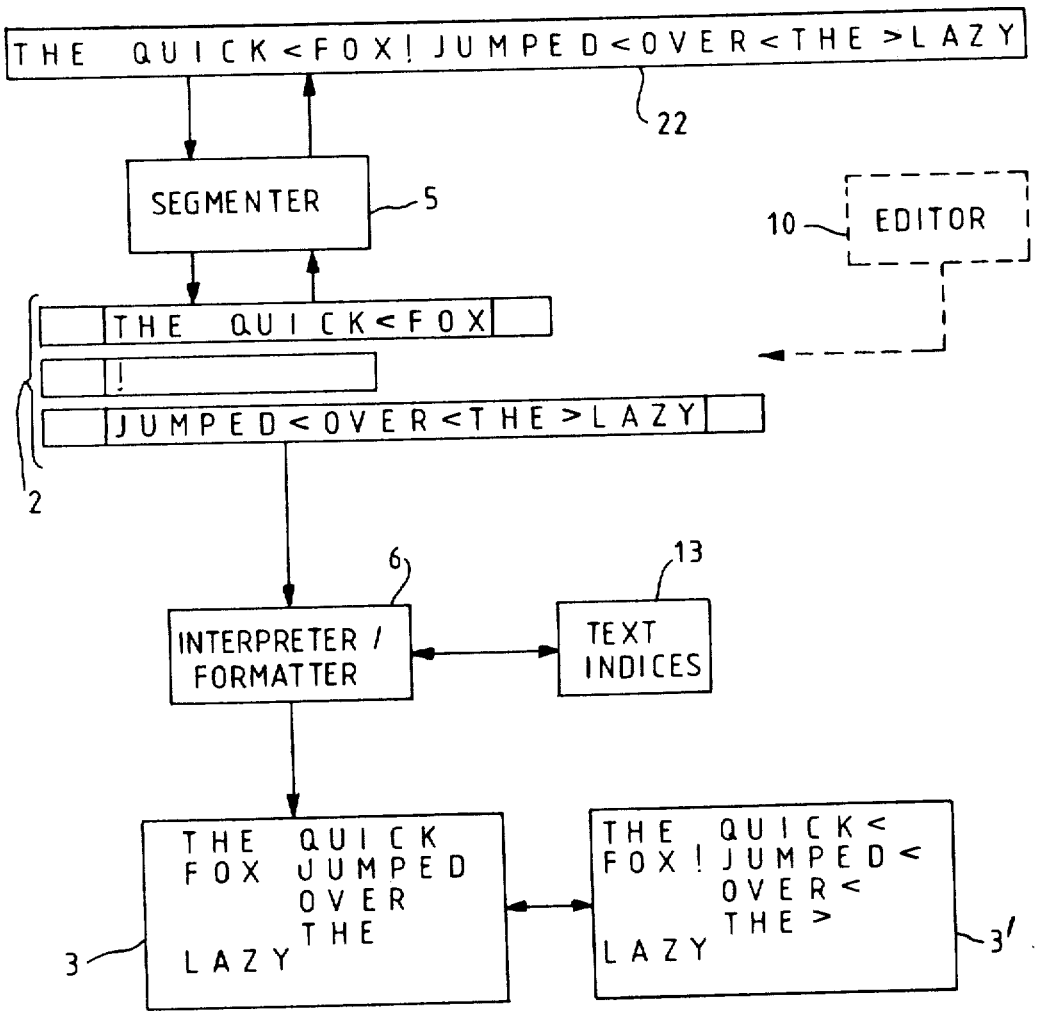
FIG. 3 diagrammatically illustrates how a text data stream is processed by the apparatus of FIG. 1.

The Text Data Stream - FIG. 3

Before describing the segmenting, editing and formatting processes in more detail, reference will be made to FIG. 3 which pictorially illustrates how a text data stream 22 is segmented, edited and formatted to appear on the display screen. It will be appreciated that in practice the text stream will consist of many hundred of characters. It is preferred that the text stream is in the form of the IBM SCS text stream although this is not essential to the present invention. The text stream 22 consists of a number of text characters consisting of text symbols and imbedded text commands. As indicated above, the text commands consist of two types, multiple-character commands, within this specification called extended formatting commands, and single-character commands. Examples of different types are given above and in the aforementioned Reference Manual. The text stream 22 shown in FIG. 3 consists of symbolic text in the form of alphabetic characters and text commands. Of the three text commands shown, those represented by the symbols "<" and ">" represent the single-character commands "new-line" and "required-new-line" respectively and that represented by the symbol "!" represents the extended formatting command "temporary-left-margin".

As illustrated in FIG. 3, the segmenter 5 (FIG. 1), in conjunction with the store manager 7, divides the text stream into three segments stored within the store 2, one consisting of a stream of text including one single-character text command, one consisting of an extended formatting command and one consisting of text and three single-character text commands. Each segment has header information and a slack area. The rules of segmentation are such that each segment has a maximum length of 256 bytes which means field 19, FIG. 2, need only be one byte. (This is significant in byte organized machines). It will be appreciated, however, that the maximum length is optional and can be made larger or smaller as desired for the particular storage system used. Any extended formatting command, recognized because its first byte is a Control Sequence Prefix (CSP), always starts a segment. The only other character which can be stored in the same segment is a trailing blank or new line character immediately following the extended formatting character. Thus, a segment will contain either none or only one of the extended formatting commands.

The Extended Formatting Command

As is explained in the above manual, each extended formatting command consists of the CSP, followed by a class byte, a count byte, a type byte, and, optionally, parameters. The class and type bytes identify the command, the count byte contains the length of the command, starting with and including the count byte itself.

The interpreter/formatter 6 loads a condensation of extended formatting commands into the status index 13 to enable efficient and rapid mapping of the stored text stream into the refresh buffer for display on the screen. Using the store manager 7 and status index 13, the interpreter/formatter 6 reads the text stream from the store 2 and maps the symbolic text and commands onto the display screen 3 formatted in accordance with the document formatting commands contained within the text stream (and in the index 13). Two display modes are possible, one without the symbols representing the text commands, and, as represented by 3', with the text commands displayed. This latter mode is particularly useful when an operator is editing the document since it shows how the document was originally created. During the editing process, the editor 10 causes characters to be deleted or inserted from or into the text stream stored within the store 2. As will be seen later, the editing process may result in the need to create new segments and to remove old segments.

What has been described so far is a text processing terminal which is capable of receiving a text data stream from a remote processor, segmenting and storing the received text stream within a store, formatting and mapping the stored data stream (or a part thereof) on a display and editing the stored data stream. The text data steam received from the host may be a complete document consisting of one or more pages, or it may consist of part of a document. Where only part of a document is received, any extended formatting commands which affect that part of the document will also be received. The received extended formatting characters are stored as part of the text data stream but are also loaded into the status index to control the formatting on the screen of that part of the received document which they govern or control.

The interpreter/formatter 6 initializes the screen by building a table of addresses of each screen row. This table is used to speed the search for the physical cursor during editing. The number of rows which can be displayed is determined by the particular display used. If an IBM 8775 Display Station or similar display is used, parameters can be supplied by the host to configure the "size" of the screen—this not the physical size, but the number of rows and columns which can be displayed. The screen is cleared with the cursor positioned at the start of the document display area.

Status Index 13

The interpreter/formatter 6 maintains the status index 13 to ensure rapid formatting. As indicated above, the status index 13 includes a page index which allows rapid access to a particular page without the need to scan the preceding text data stream, a row index which contains similar information about each row of the current page, and a current index which is used by the interpreter/formatter to collect the text formatting commands prior to transferring them to the appropriate row index.

The appearance of the page index is as follows:
1. Page width
2. Page depth
3. Temporary Left Margin position
4. Tab settings
5. Address of data within the store (segment+offset)
6. Flags (skip, adjust, center)
7. Page number Optionally, the index could hold the address of the tab setting rather than hold the tab settings themselves. This could save both process time and memory usage.

The row index contains one entry for each text line of the current page. The entries are similar to those in the page index except that the page number is not required. The first row index entry contains status information for the first line of a page. Alternatively, the row index entries could be limited to a single screen of text lines. This would use less storage but lead to poorer browsing performance since to scroll back one screen would require the top line row index entry of the current screen to be saved. (The interpreter/formatter would commence processing at the beginning of the first line of the current page building a row index entry for each line until the entire first screen is displayed, a comparison then being made between the bottom entry of the resulting row index and the original stored entry. If these match the "screen back" operation is complete, but if not, then the whole process would be repeated commencing with the next line of the page and so on until the test is successful. This complication arises because the displayed lines may not necessarily be on an integral screen boundary within the page. This will almost certainly be the case if the operator has used a cursor scroll key.)

The current index is a single entry containing the same information as the page index. It is used for holding the current document status information derived during the formatting operation. The index for the first page may be initialized with a predetermined set of data (tab settings, temporary left margin setting, etc.) or alternatively, the initialization data could be sent to the terminal from the host processor.

Figure 4:
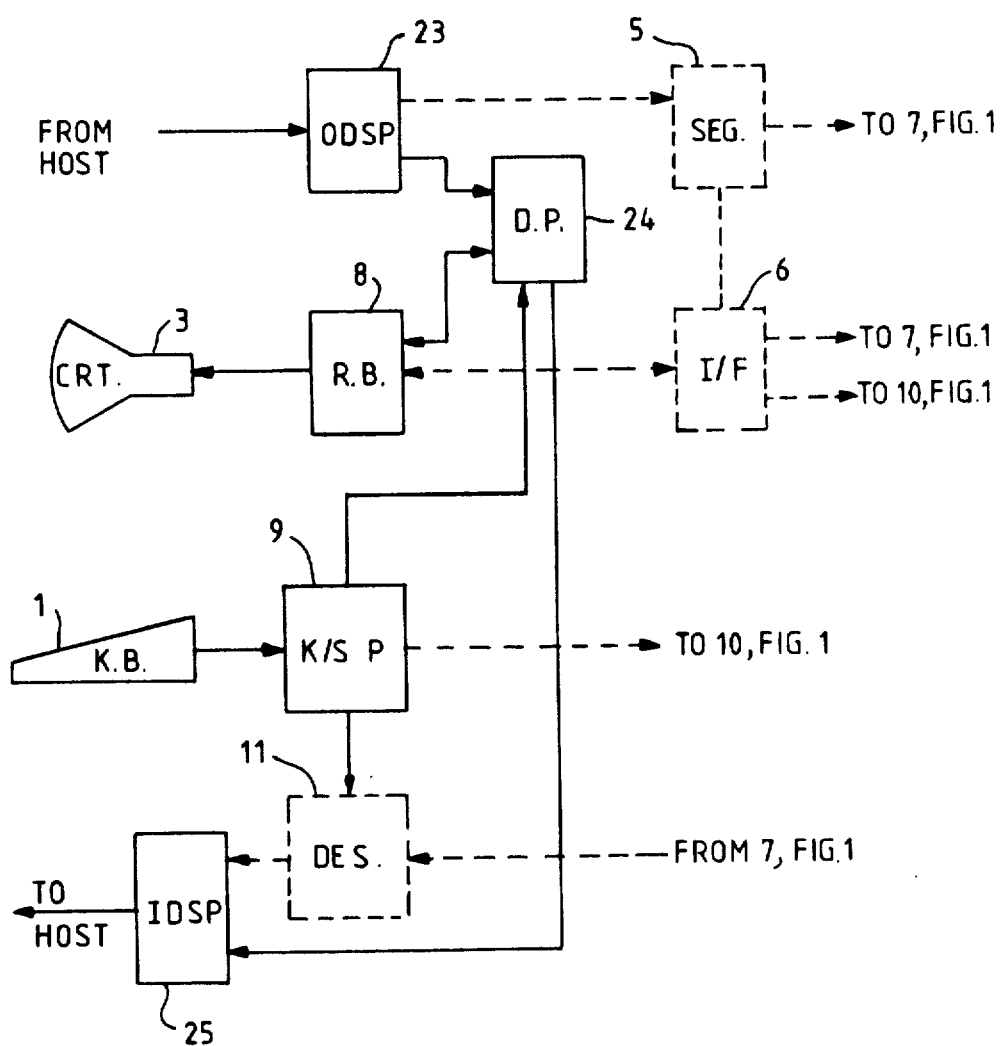
FIG. 4 shows a modification of the apparatus shown in FIG. 1 which can be used for processing non-textual data as well as text.

A Modified Apparatus - FIG. 4

FIG. 4 is a modification of the terminal shown in FIG. 1 showing how the text processing apparatus of the present invention could be implemented on a data-entry display terminal such as the IBM 8775 Display Terminal. In FIG. 4, outbound data received from the host processor is processed within an outbound data stream processor (ODSP) 23 which routes the incoming data processing functions (DP) 24. Routing is determined by the type of header associated with the data. When in data processing mode as opposed to text processing mode, keystroke processor 9 routes keystrokes to the normal DP functions 24. Text or data streams being sent back to the host are routed through an inbound data stream processor (IDSP) 25 as shown. Those parts of FIG. 4 which are used only for text processing are shown in phantom in FIG. 4 while parts which are used for data or data and text are shown in solid line.

Figure 5:
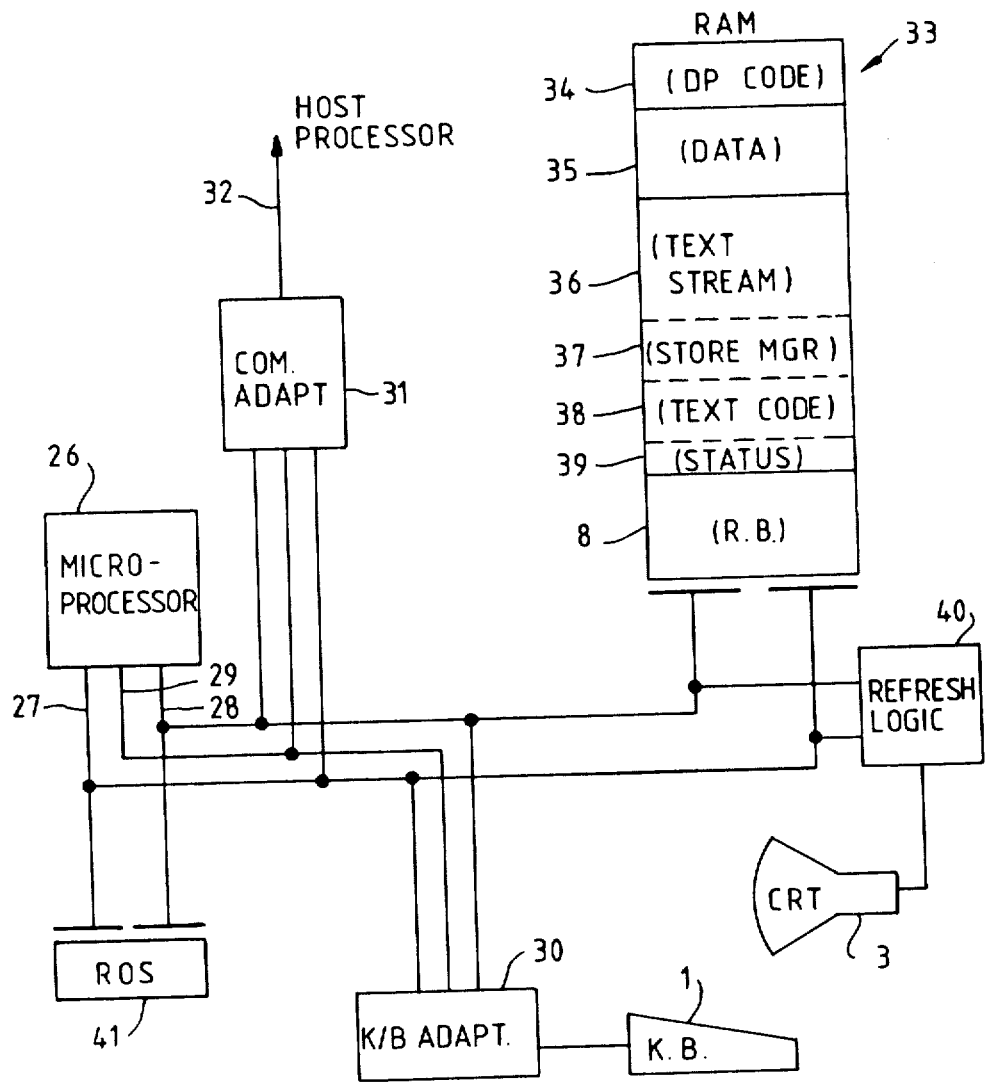
FIG. 5 is a block diagram of a preferred embodiment of the invention employing a single microprocessor to edit text stored as a text data stream.

The Embodiment of FIG. 5

FIG. 5 illustrates how the apparatus of FIGS. 1 and 4 can be built using a single microprocessor 26, for example, a Motorola M6800 microprocessor, with various components, known per se, connected thereto through an 8-bit data bus 27, a 16-bit address bus 28 and an interrupt line 29. The keyboard 1 is connected to the system bus through a keyboard adapter 30, which, in known manner, interfaces the scan codes from the keyboard with the microprocessor 1. A communication adapter 31 interfaces the microprocessor 26 with a communication link 32 to the host processor. Connected to the data and address buses 27 and 28 is a random access memory 33 divided into a number of sections. Section 34 contains microcode for data entry applications. Section 35 contains data entered in the terminal or sent by the host. Section 36 constitutes the text store 2 of FIG. 1 in which the text is stored in text stream form. Section 37 contains code for managing text segments in the text store 7, FIG. 1, and section 38 contains code for controlling the segmenting, desegmenting, formatting and editing processes 5, 11, 6 and 10, FIG. 1. Section 39 stores the status index 13, FIG. 1 containing the condensed extended formatting commands. Finally, section 8 constitutes the refresh buffer for refreshing the CRT display 3 as in FIG. 1. Data or text to be displayed is loaded into section 8 from section 35 or section 36 by the microprocessor when the data or text is called by the operator or a program. Refresh logic 40 periodically reads the contents of section 8 and drives the CRT display 3 in accordance with the characters stored therein. A read only store (ROS) 41, is used to store common code which does not require changing.

As indicated above, the various components of FIG. 5 are known per se and may be constituted by suitably configuring an IBM 8775 Display Terminal. No detailed description of the components will be given. However, it is in order for more details to be given of the priorities assigned to the various processes and for flowcharts of the more complicated processes to be given.

The task structure is similar to that on the 8775 and has six levels of priority as follows, highest priority first:

1. Host link communication.
2. Keyboard adapter providing keyboard data service
3. Keystroke processing, text editing, interpreting and store management.
4. Inbound (to the host) data stream processing, desegmentation.
5. Outbound (from the host) data stream processing, segmenting.
6. Monitoring, scheduling.

Table I below is a flowchart in tabular form of the segmentation process:

TABLE I
(SEGMENTATION PROCESS)

1. Interpret first character in text data stream, go to 2.
2. If extended formatting command, go to 3; if not, go to 8.
3. Create new segment, store command, and go to 4.
4. Interpret next character in data stream and if new line command store with extended formatting command and go to 7; if no, go to 5 if it is not an extended formatting command, but to 2, if it is.
5. Create new segment and store character, go to 6.
6. If another character in text data stream go to 7, if not go to 11.
7. Interpret character and go to 2.
8. If existing segment at maximum go to 9; if not, go to 10.
9. Create new segment, store character and go to 6.
10. Store character in existing segment and go to 6.
11. Terminate segmenting process.

In step 1, the segmenter 5 interprets the first character in the text data stream. In step 2, when an extended formatting command is recognized, a request is made to the store manager 7 for a new storage segment in which the extended formatting command is stored. The next character is interpreted in step 4 and if a blank or new line command is stored with the extended formatting command. If the character is not a blank or new line character, the segmenter 5 requests a new segment from the store manager 7 and stores the character therein (step 5). If this character were an extended formatting command, step 2 would be repeated but if it is not a space, a new line command or an extended formatting command, step 6 would follow. In step 6, a determination is made by the segmenter whether there is another character in the text stream and if there is, it is interpreted as in step 7: if there is no further character, the segmenting process is terminated (step 11) because the text data stream has been segmented and stored. If the determination in step 7 shows there is another character in the text stream, step 2 is repeated to determine whether or not it is an extended formatting command. If the determination at step 2 is that the character is not an extended formatting command, a determination is made in step 8 as to whether the existing segment has reached its maximum size and if it has, a new segment is requested from the store manager 7 and the character stored therein, step 6 then being repeated. If the determination in step 8 indicates that the existing segment is below the maximum size, the character is stored therein as in step 10 and step 6 is repeated.

Thus, during the segmentation process, a new segment is obtained by the segmenter 5 from the store manager 7 each time an extended formatting command is encountered and each time an existing segment is at its maximum size. Each time a new segment is created, it is forward chained with the preceding segment which is reverse chained with it. This forward and reverse chaining is performed by the editor 10. Each time a character is stored in a segment, the length field 19 in the text segment is updated, also by the editor 10. As explained above, the interpreter/formatter 6 updates the status index 13 each time an extended formatting command is encountered during the formatting process. Each segment containing an extended formatting command has a length corresponding to the length of that command plus one byte for the trailing blank or new-line character. The other segments have variable lengths up to the maximum 256 bytes including a slack area for the subsequent insertion of characters during editing.

The Store Manager

The aforementioned European Patent application entitled, "Virtual Memory Terminal" (application No. 80 3021922) describes the store manager in detail and the creation and modification of fields 15 and 16 of the segments. One difference between the present arrangement and that described in the aforementioned application is that the latter does not use slack areas in the segments. However, the process by which segments (including their slack areas) is managed within the store memory is the same so it will not be described in more detail in the present specification. The store manager will only need to create new segments during the editing process when a new extended formatting command is inserted or a slack area is filled during character insertion. The store manager will only need to delete segments when it is informed by the editor 10 (by means of a call) that all characters have been deleted from the segment. It should be emphasized that the forward and reverse pointers in fields 17 and 18 and length count in field 19 are not used by the store manager 7 which also assumes that all segments passed to it are full—in other words, it does not recognize the slack space and does not attempt to shorten segments.

Table II below is a flowchart in tabular form showing the character insertion process during editing of the stored text:

TABLE II
(CHARACTER INSERTION PROCESS)

1. If character being inserted is extended formatting command go to 2; if not, go to 3.
2. Create new segment, and modify pointers.
3. If insertion point is first character position in segment, go to 4; if not, go to 5.
4. If slack available in previous segment, fetch

TABLE II-continued
(CHARACTER INSERTION PROCESS)

and store inserted character; if not, go to 5.
5. If slack available in current segment, insert character; if not, go to 6.
6. Request new segment and if sufficient space in store available, go to 10; if not, go to 7.
7. Consolidate text segments in storage and go to 8.
8. If sufficient space available, go to 10; if not, go to 9.
9. Indicate storage full or use backing store.
10. Create new segment, insert text in existing segment to right of insertion point in new segment, delete text to right of insertion point in existing segment and insert new character at end of existing segment, modifying pointers in existing and next segments, and length fields in existing and new segments.

In step 1, a determination is made by the editor 10 whether or not the entered character is an extended formatting command. If it is, the store manager 7 is asked for a new segment as in step 2 and the character is stored therein: the pointers in fields 17 and 18 of the preceding and succeeding segments are changed (the store manager 7 modifying the information in the header field 15). If the determination in step 1 is negative a determination is made in step 3 to determine if the insertion point is the first character position in the segment and, if it is, a determination is made at step 4 to determine if there is slack available and if so, the inserted character is inserted at the end of the text stream in the previous segment, the length count field 19 being suitably increased. If the determination in step 4 is negative, a determination is made in step 5 as to whether there is slack available in the current segment; if there is, the character is inserted and the length count in field 19 incremented. If the determination in step 5 is negative, the store manager is asked for a new segment and if there is sufficient space in the store a new segment will be provided and the character will be inserted in the new segment as in step 10. If the store manager indicates that there is insufficient space to supply a new segment, an attempt is made to consolidate text segments in the store as in step 7. Consolidation involves the segmenter 5 scanning the stored segments for segments with relatively large slack areas due to character deletion and decreasing the size of such segments to release storage space. A determination is made in step 8 to see whether sufficient free space has been released within the store to allow a new segment to be created; if it has, step 10 will be performed. If there is still insufficient space in the store, then the segments in the store are relocated by the storage manager to free fragmented inter segment space. If after this, there is still insufficient space, an indication is given to the operator as at step 9 that the store is full. The operator can then transmit text which has already been edited from the terminal to the host processor to release space in the store. (The desegmenter (DES) 11, FIG. 1, will strip segment headers from the text stream as it passes to the host.)

This would be the case where no backing store is provided to the store. However, if a backing store were provided, either in the terminal or at the host, in accordance with the teaching of the aforementioned application entitled "Virtual Memory Terminal", the store manager would page text from the text store into the backing store to create more free space in the text store; this alternative is indicated in step 9. Step 10 represents the position where there was no slack available for character insertion. In this event, a new segment is created with text to the right of the insertion point being deleted from the existing segment and stored in the new segment. The segment pointers and length are appropriately adjusted. Should the terminal utilize such a backing store, this would not be apparent to the operator since the management of the store and backing store would be handled automatically by the storage manager of the aforementioned application.

Thus, each time a new segment is required during the editing process, the appropriate pointers are set within the adjacent segments. Each time a character is entered into a segment, the count field of that segment is set. When an extended formatting command is entered, it is stored within the text stream and the status index subsequently updated.

Deletion of characters is somewhat less complicated. If an extended formatting command is deleted, its segment is deleted from the text stream and the pointers of the segments which previously surrounded it are set to point to one another. As other characters are deleted, the slack area of the segment in which they are stored grows and the length field count decreased. When a segment contains no text, it is deleted from the segmented text stream with appropriate re-setting of the pointers in the segments surrounding it.

After the document, or that part of a document stored in the store, has been edited to the satisfaction of the operator, the segmented text stream is read from the store and passed to the desegmenter 11, FIGS. 1 and 4, where the header fields 15 to 19 are removed for onward transmission of the text stream to the host processor in the same form that it was received.

The Interpreter/Formatter

The operation of the interpreter/formatter 6 on the segmented text stream will now be described in more detail.

The input to the interpreter/formatter 6 is certain status information pertaining to the first row to be written (for example display/non-display controls flag, etc.), the left hand screen address of the first row to be written, and the address of the entry in the row index corresponding to the first row to be displayed (this contains the 'starting' parameters). To display the top of the document, the first entry in the page index is moved into the current index. The first entry in the row index is where the current status is to be saved. Remember that the current status is accumulated while scanning the text data stream. The Row Index update takes place at the end of each row.

To move a screen "forward" for a screen of N rows of text, the current index is created from the data held in the row index N−1 entries further on from that describing the top of the screen. Formatting starts at the second row of the screen. If a page boundary is encountered during interpretation, then formatting ceases and the current index is transferred to the next page index entry.

To move a screen "backward" for a screen of N rows of text, the current index is created from the row index entry N−1 entries back from that describing the top of the screen. If such a row does not exist then the first row index entry is the source of the current index.

To move a page forward, the current page number is incremented by one and the corresponding entry in the page index is transferred to the current index. Formatting starts at the top of the screen and stores status information into the row index starting with the first entry. To move a page backwards, the current page number is decremented by one and the corresponding entry in the page index is transferred to the current index. Formatting starts at the top of the screen and stores status information into the row index starting with the first entry.

In a cursor scroll operation, the screen row containing the cursor is found and the corresponding entry in the row index is moved to the current index. The address to the entry in the row index is passed to the interpreter. Formatting starts at the top of the screen. The cursor address is decremented by W, the screen width + left and right hand margin bytes, for each row it is moved up.

When the first screen of a document is displayed for the first time, these commands are not shown. When a designated function key is depressed, the text formatter changes to a 'display controls' mode of operation. the screen of text is reshown but this time all recognized commands are displayed. The single-character commands that can be displayed are tab, space, required space, new line, required new line. This is achieved by modifying the EBCDIC to internal code translation table. The extended formatting commands that can be displayed are width, depth, tab setting, adjust on/off, center on/off, skip, required page boundary, page boundary, temporary left margin. With the exception of the temporary left margin command which is displayed as a single character embedded within the text, the commands are displayed on separate screen rows in a mnemonic form. The tab set command is displayed in a way similar to the tab rack at the top of the screen. Each command row begins with a sign to highlight the command. When the editor is in display mode and a temporary left margin character is to be displayed, the right hand margin for that row is moved one column to the right by one position.

When the same Function key is next depressed the text is re-displayed without the control characters visible and the display is said to be in 'non-display controls' mode. Thus, the key toggles the display between the two display modes.

The interpreter/formatter 6 begins formatting at a given starting row and continues to build one row at a time until the end of the screen. As each row is processed, status information is gathered in the current index. This is saved for successive rows in the row index starting at the specified entry. If a page end command is encountered during row processing, then the following rows on the screen will be erased. If a key is depressed during formatting, then the interpreter is terminated at the end of the current row and control is passed back to the keystroke processor 9. The effect of this is to give higher priority to keystroke processing than to screen formatting. The operator's typing rhythm will not be interrupted by inadvertently causing the keyboard to overrun the screen formatting process with an inevitable loss of keystrokes.

The interpreter/formatter 6 commences processing by fetching the segment containing the first byte of the text data stream. This segment identification and offset within the segment are stored in the current index passed on entry. The store manager 7 returns a real storage address corresponding to the segment. The associated offset is added to this address to give the effective address of the first byte of text data. Subsequently, all accesses to the text data stream are made using a set of macro primitives that take care of segment boundaries and the bi-directional segment chaining.

The interpreter accesses each character in turn and, in the case of text symbols, translates and writes them to the display refresh buffer 8. The current temporary left margin position determines where the first character on a row is to be written. A tab character will cause the next character to be written at the next tab position as specified in the current index tab settings. If the rightmost character is not a word delimiter, then the position is cleared and the screen and text stream pointers are decremented until one is found. This is equivalent to word spilling in other text systems. If an extended formatting command is encountered, it is immediately interpreted and the current index is updated.

Row formatting is terminated when any of the following conditions are detected:

(a) Page Boundary
(b) Required New Line
(c) Extended formatting command and terminal in 'display controls' mode.
(d) New Line and terminal not in 'Adjusted Text' mode.
(e) The right hand margin of the document is reached.
(f) Skipping is in effect.
(g) End of Text Stream encountered.
(h) The logical cursor has been found as requested by the editor 10.
(i) In 'no display controls' mode an extended formatting command is found while formatting to the right of the left hand margin.

When not in adjusted text mode, the right hand margin corresponds with the right hand edge of the screen. In adjust mode, it is coincident with the page width.

Summary

What has been described is a text processing terminal in which a text stream is stored in a text store as a chained series of variable-length segments containing slack areas for the insertion of text during editing, incoming text streams being segmented in accordance with specified rules. During subsequent editing, characters are inserted or deleted from segments and new segments created as necessary. A formatter reads text segments from the text store and maps and formats the text characters into a refresh buffer for display on the screen. The editing process has a higher priority than the formatting process so that keystrokes are processed to change the text in the text store before the changed text is mapped onto the screen by the formatter. A status index containing condensed extended formatting commands speeds up the formatting process. With such an arrangement, the text processing terminal can be implemented with a single microprocessor.

Although the use of a microprocessor has been described and is preferred because of its flexibility, those skilled in the art will appreciate that conventional hardwired logic could be used instead for the text segmenting, formatting, editing and desegmenting processes. As mentioned earlier, a backing store could be provided within the terminal to allow larger documents to be stored therein, text being paged to and fro between the backing store and the text store as necessary in accordance with the teachings of the aforementioned application entitled "Virtual Memory Terminal."

While the invention has been particularly shown and described with reference to a preferred embodiment thereof, it will be understood by those skilled in the art that various other changes in form and detail may be made therein without departing from the spirit and scope of the invention.

Having thus described our invention, what we claim as new and desire to secure by Letters Patent is:

1. A text processing apparatus for use with a host processor capable of receiving, storing, and transmitting previously keyed text, the text including symbolic characters and text control characters, the text control characters including multi-character extended formatting commands affecting the format of a document, comprising a keyboard for entering text, means for receiving text from the host processor in text stream form, means coupled to said text stream receiving means for storing said text stream, including said control characters, in said data stream format, editing means connected for receiving keystroke signals from said keyboard and including means for modifying said text stream stored in said storing means in accordance with said keystroke signals on a keystroke-by-keystroke basis, and a display for displaying said stored text, wherein the improvement comprises, text segmenting means for dividing said received text stream into segments and for chaining said segments, each segment having a variable-length of text and having a predetermined maximum length of text, the area within the maximum length not occupied by text being designated a slack area, each segment having at most one extended formatting command therein and segments not having an extended formatting command therein having a slack area not containing data and therefor available for inserts, and formatting means for reading said segmented text stream from said text store and mapping the contents thereof onto said display and means in said editing means for invoking said formatting means when a text editing step has been completed.

2. Apparatus as claimed in claim 1, wherein said formatting means includes means to maintain a status index containing extended formatting commands stored within said text store.

3. Apparatus as defined in claim 2, wherein said status index includes a page index table for each page of text stored in said text store and a row index table for each row of the page of text being displayed.

4. Apparatus as defined in claim 1, wherein said editing means includes means to interrupt said formatting means upon receipt of a keystroke from said keyboard invoking said editing means to perform a text editing operation.

* * * * *